United States Patent
Marupaduga et al.

(10) Patent No.: US 10,477,423 B1
(45) Date of Patent: Nov. 12, 2019

(54) CONTROL OF CHANNEL STATE REPORTING RATE BASED ON EXTENT TO WHICH THE REPORTING DEVICE PROVIDES CONNECTIVITY FOR ONE OR MORE OTHER DEVICES

(71) Applicant: Sprint Spectrum L.P., Overland Park, KS (US)

(72) Inventors: Sreekar Marupaduga, Overland Park, KS (US); Ryan P. Dreiling, Shawnee, KS (US); Vanil Parihar, Overland Park, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 547 days.

(21) Appl. No.: 14/886,642

(22) Filed: Oct. 19, 2015

(51) Int. Cl.
| | |
|---|---|
| *H04W 24/10* | (2009.01) |
| *H04W 72/04* | (2009.01) |
| *H04L 1/00* | (2006.01) |
| *H04W 88/02* | (2009.01) |
| *H04W 88/08* | (2009.01) |
| *H04W 92/10* | (2009.01) |

(52) U.S. Cl.
CPC ........... *H04W 24/10* (2013.01); *H04L 1/0026* (2013.01); *H04W 72/0406* (2013.01); *H04W 88/02* (2013.01); *H04W 88/08* (2013.01); *H04W 92/10* (2013.01)

(58) Field of Classification Search
None
See application file for complete search history.

(56) References Cited

U.S. PATENT DOCUMENTS

| | | | | |
|---|---|---|---|---|
| 2012/0106437 | A1* | 5/2012 | Seo | H04B 7/15542 370/315 |
| 2012/0230238 | A1* | 9/2012 | Dalsgaard | H04L 1/0026 370/311 |
| 2013/0040558 | A1* | 2/2013 | Kazmi | H04W 16/26 455/9 |
| 2016/0337056 | A1* | 11/2016 | Frenne | H04B 7/0695 |

FOREIGN PATENT DOCUMENTS

| | | |
|---|---|---|
| WO | WO 2010/019080 | 2/2010 |
| WO | WO 2010019080 A1 * 2/2010 | ........... H04L 1/0025 |

OTHER PUBLICATIONS

3GPP, 3rd Generation Partnership Project; Technical Specification Group Radio Access Network; Evolved Universal Terrestrial Radio Access (E-UTRA); Physical layer procedures (Release 8), 3GPP TS 36.213, V8.1.0 (Nov. 2007).

* cited by examiner

*Primary Examiner* — Adnan Baig

(57) ABSTRACT

A method and system for managing channel state reporting rate for transmission of channel state reports from a wireless communication device (WCD) to its serving base station based. The channel state reports provide metrics regarding a wireless communication channel between the WCD and the base station, and the channel state reporting rate defines how often the WCD will transmit such reports. Per the disclosure, the channel state reporting rate could be set to a higher value (for more frequent channel state reporting) if the WCD provides such connectivity and a lower value (perhaps a default value) if not, and the reporting rate could be set higher as the WCD provides connectivity for a greater number of other devices.

20 Claims, 4 Drawing Sheets

CONTROL OF CHANNEL STATE REPORTING RATE BASED ON EXTENT TO WHICH THE REPORTING DEVICE PROVIDES CONNECTIVITY FOR ONE OR MORE OTHER DEVICES

BACKGROUND

Unless otherwise indicated herein, the description provided in this section is not itself prior art to the claims and is not admitted to be prior art by inclusion in this section.

A typical wireless network includes a number of base stations each radiating to provide coverage in which to serve wireless communication devices (WCDs) such as cell phones, tablet computers, tracking devices, embedded wireless modules, and other wirelessly equipped devices. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other UEs served by the base station.

Further, a wireless network may operate in accordance with a particular air interface protocol (i.e., radio access technology), with communications from the base stations to WCDs defining a downlink or forward link and communications from the WCDs to the base stations defining an uplink or reverse link. Examples of existing air interface protocols include, without limitation, wireless wide area network (WWAN) protocols such as Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), and Global System for Mobile Communications (GSM), and wireless local area network (WLAN) protocols such as IEEE 802.11 (WIFI), BLUETOOTH, and others. Each protocol may define its own procedures for registration of WCDs, initiation of communications, handover between coverage areas, and other functions related to air interface communication.

In practice, a base station may be configured to provide service to WCDs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

Each carrier may also define various logical channels to facilitate communication between the base station and one or more served WCDs. For instance, on the downlink, a carrier may define a reference channel on which the base station broadcasts a reference signal useable by WCDs to detect and evaluate coverage, various other downlink control channels to carry control signaling (such as resource-scheduling directives) to WCDs, and one or more shared or traffic channels for carrying bearer data (e.g., user or application level data) to WCDs. And on the uplink, a carrier may define one or more uplink control channels to carry control signaling (such as resource scheduling requests, channel state reports, and the like) from WCDs, and one or more shared or traffic channels for carrying bearer data from WCDs. In practice, the shared or traffic channels may define particular physical resources for carrying data between the base station and WCDs.

When a WCD enters into coverage of a base station, the WCD may attach, register, or otherwise associate with the base station, and the base station may then serve the WCD on one or more carriers. In practice, the process of serving the WCD may involve the base station allocating use of particular air interface resources, such as traffic channels or portions thereof, to carry data communications to and from the WCD, and managing transmission on those resources, such as controlling what modulation scheme is used for the transmissions.

For instance, when the base station has data to transmit to the WCD, the base station may select certain downlink resources to carry the data and may determine a modulation scheme for transmission on those resources, and the base station may then (i) transmit to the WCD a scheduling directive instructing the WCD to receive the data on the scheduled resources using the determined modulation scheme, and (ii) transmit the data on the indicated downlink resources using the determined modulation scheme. Likewise, when the base station receives from the WCD a request for the WCD to transmit data to the base station, the base station may select certain uplink resources to carry the data and may determine a modulation scheme for transmission on those resources, and the base station may then (i) transmit to the WCD a scheduling directive instructing the WCD to transmit the data on the scheduled resources using the determined modulation scheme and (ii) receive the transmission from the WCD accordingly.

To efficiently serve a WCD, a base station may keep track of the WCD's channel state, such as the WCD's downlink signal strength and quality and the WCD's radio/antenna configuration, and may set or adjust service parameters for the WCD accordingly. By way of example, the base station could use the WCD's channel state as a basis to select an appropriate modulation scheme or transmission format to use for transmission to or from the WCD. For instance, the base station could select a higher-order modulation scheme if the channel state is relatively good and a lower-order modulation scheme if the channel state is relatively poor, as a lower order modulation scheme may be more reliable than a higher order modulation scheme in poor channel conditions.

To facilitate this in practice, each WCD served by the base station may periodically determine and report its channel state to the base station, at regular intervals according to a defined channels state reporting rate. For instance, each WCD may periodically establish one or more channel state metrics based downlink signal strength measurements and radio/antenna configuration and generate and transmit one or more associated channel state reports to the base station. The WCDs may transmit these channel state reports to the base station on uplink signaling channels and/or uplink traffic The base station may thus receive these reports and keep a record of each WCD's latest indicated channel state, so that the base station can set or adjust its service of the WCD accordingly.

OVERVIEW

Ideally, to help ensure that the base station has accurate and up-to-date channel state information for its served WCDs, all of the WCDs could be configured to determine and report their channel state to the base station at a relatively high channel state reporting rate. Unfortunately, however, this reporting arrangement can contribute to high uplink load on the air interface, which could present issues for other uplink communication. For instance, if WCDs are configured to report their channel state at a relatively high rate on a shared uplink signaling channel, the uplink signaling channel could become congested, which could prevent WCDs from sending other signaling messages such as scheduling requests and the like. Consequently, an improvement is desired.

The present disclosure provides for differentially setting the channel state reporting rate for WCDs based on a consideration of the extent to which each WCD provides at least one other device with connectivity to the base station. As such, the disclosure draws a distinction between WCDs operating as endpoint (e.g., end-user) devices, such as cell phones or wirelessly equipped computers, and WCDs serving as intermediaries between the base station and one or more other devices, such as in a relay, hotspot, or device-to-device arrangement or the like. The theory here is that if a WCD provides connectivity for one or more other devices, the WCD's air interface communication with the base station may impact the communication of each other device with the base station via the WCD, and so it would be beneficial to more frequently inform the base station of the WCD's channel state, to allow the base station to more frequently adjust its service of the WCD accordingly. Whereas, if a WCD does not provide connectivity for one or more other devices, the WCD's air interface communication with the base station would not have that impact, and so the WCD could perhaps provide less frequent channel state reports.

In accordance with the disclosure, a WCD could thus be configured to engage in channel state reporting to its serving base station at a channel state reporting rate established based on an extent to which the WCD provides connectivity between at least one other device and the base station.

The extent at issue in this process could be a question of whether or not the WCD is the type of device that provides such connectivity, such as whether or not the WCD is configured, used, connected, or arranged to provide such connectivity (e.g., whether the device is just an endpoint device or is rather configured or connected to function as a relay, hotspot, or the like). If the WCD is the type of device that provides such connectivity, then it may be appropriate for the device to generally apply a higher channel state reporting rate. Whereas, if the WCD is not the type of device that provides such connectivity, then it may be appropriate for the device to apply a lower channel state reporting rate.

Alternatively or additionally, the extent could be a question of how many other devices the WCD is currently providing with such connectivity. If the WCD is providing connectivity for a greater number of such devices, then it may be appropriate for the WCD to apply a higher channel state reporting rate. Whereas, if the WCD is providing connectivity for fewer such devices (or no such devices), then it may be appropriate for the WCD to apply a lower channel state reporting rate. Further, the issue in this regard could relate to whether the WCD is currently providing connectivity for at least two other devices, as providing connectivity for at least two other devices may justify applying a channel state reporting rate higher than the rate that would be applied for a mere endpoint WCD.

This process could be implemented by the WCD and/or by the base station. For example, the WCD or the base station could have profile or service information for the WCD indicating the extent to which the WCD is configured to provide connectivity between at least one other device and the base station, and the WCD or base station could establish and cause the WCD to apply a channel state reporting rate based on that information. If the process is applied by the WCD, then the WCD could set itself to determine and report its channel state at the established rate. Whereas, if the process is applied by the base station, then the base station could transmit to the WCD a control signal that directs the WCD to transmit and report its channel state at the established rate.

In practice, for instance, the base station could define and specify in a broadcast system message a default channel state reporting rate for the coverage area, and the WCD or base station could deem that rate to apply if the WCD does not provide connectivity for at least one other device. But if the WCD provides connectivity for at least one other device, then the WCD or base station could deem a higher rate to apply, perhaps with the rate being set higher as the WCD provides connectivity for a greater number of other devices, such as for at least two other devices. Further, the WCD and/or base station could take into account additional factors as well when setting the WCD's channel state reporting rate.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example air interface protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
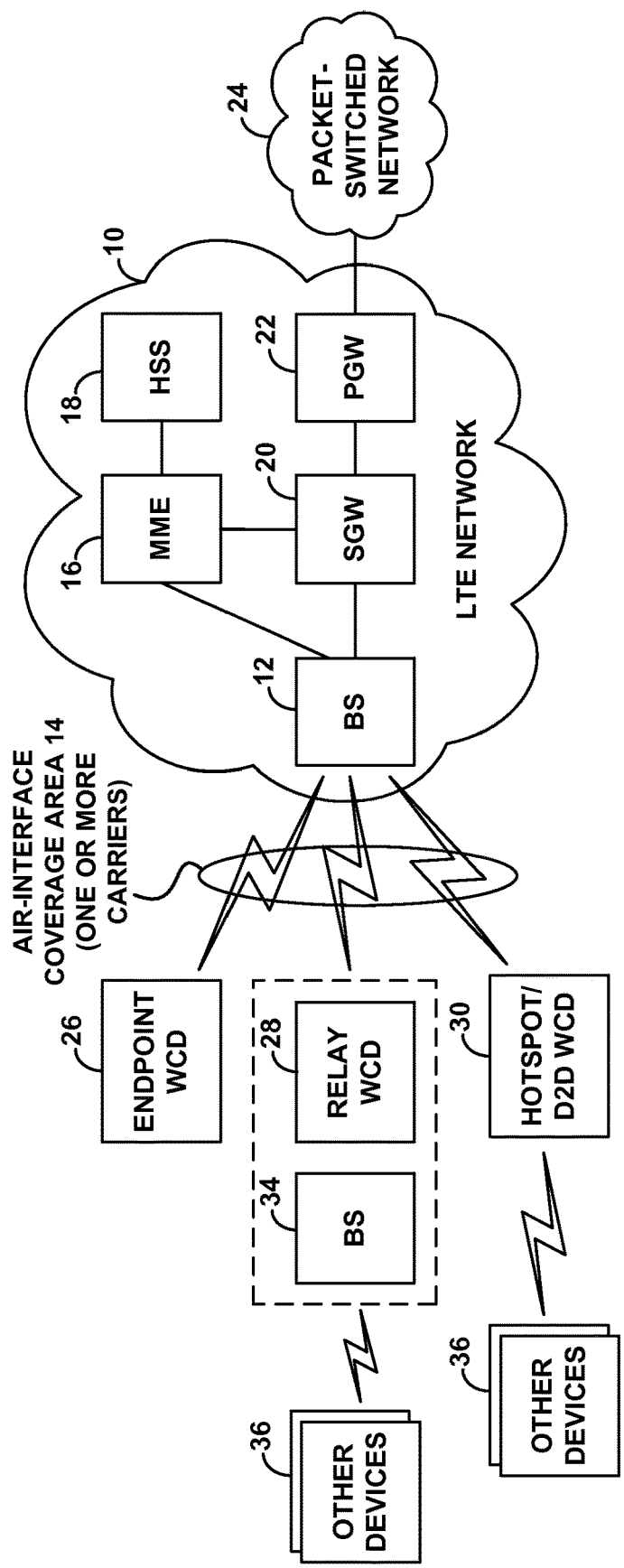
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve WCDs with wireless packet data communication service, including possibly voice-over-packet service, but may also provide other functions. As shown, the LTE network 10 includes a base station (LTE evolved Node-B (eNodeB)) 12, which has an antenna structure and associated equipment for providing an LTE coverage area 14 in which to serve the WCDs. The base station 12 then has a communication interface with a mobility management entity (MME) 16 that functions as a signaling controller for the LTE network 10 and has a communication interface with a home subscriber server (HSS) 18. Further, the base station 12 has a communication interface with a serving gateway (SGW) 20, which in turn has a communication interface with a packet-data-network gateway (PGW) 22 that provides connectivity with a packet-switched network 24 such as the Internet, and the MME 18 has a communication interface with the SGW 20. In practice, the illustrated components of the LTE network 10 may sit as nodes on a private packet-switched network owned by an operator of the LTE network 10, and thus the various communication interfaces may be logical interfaces within that network.

In addition, FIG. 1 illustrates three example WCDs 26, 28, 30 being served by the base station 12 over air interface 14 (e.g., within a particular coverage area of the base station). WCD 26 is typical end-user WCD such as a cell phone or wirelessly-equipped computer, tablet, or other device that does not provide connectivity for at least one other device. WCDs 28 and 30, on the other hand, are WCDs that provide connectivity for at least one other device. In particular, WCD 28 is connected, configured, or otherwise arranged as a "relay-WCD" coupled or integrated with a small cell base station (also referred to as a "mini-macro base station) 34 or the like that is in turn configured (similar to base station 12) to serve other devices 36. So WCD 28 functions as an intermediary between base station 12 and any devices served by small cell base station 34, with the air interface connection between WCD 28 and base station 12 functioning as a wireless backhaul link for the small cell base station 34. And WCD 30 is configured as a hotspot or device-to-device (D2D) WCD (such as a cell phone having a personal-hotspot feature), similar to the relay-WCD, to function as an intermediary between base station 12 and one or more other devices 36.

In practice, when any such WCD enters into coverage of base station 12, the WCD may engage in a process to attach with, hand over to, or otherwise associate with the base station, which may result in establishment of a radio link layer connection (e.g., radio resource control (RRC) connection) over the air between the WCD and the base station and preparation of the network to facilitate serving the WCD. For instance, the WCD may transmit an attach request to the base station, which the base station may forward to the MME, and the MME may then engage in signaling to control setup of one or more bearers for carrying data for the WCD between the PGW and the base station. Further, in this attach process, the WCD may convey to the base station information about the WCD's profile and configuration, and the MME may also receive WCD profile and configuration information from the HSS and convey that information to the base station, and the base station may store this information in a local context record for the WCD.

The base station may then serve the WCD, scheduling downlink and uplink communications as discussed above for instance. In particular, if the base station receives from the SGW data to be transmitted to the WCD, the base station may schedule and engage in transmission of the data to the WCD using an appropriate modulation scheme. And if the WCD requests transmission of data to the base station, the base station may schedule transmission of the data from the WCD using an appropriate modulation scheme, and the WCD may transmit the data accordingly.

Further, if a WCD provides connectivity for one or more other devices, the radio link layer connection between the WCD and the base station 12 may also carry signaling and bearer data related to each such other device. For instance, considering relay-WCD 28, the small cell base station 34 may operate as a base station of the LTE network, but its communications with other entities in the LTE network (such as with an SGW and MME) would occur via the relay-WCD 28 and via the radio link layer connection between the relay-WCD 28 and the base station 12. Thus, when data is to be transmitted from the LTE network to a device served by the small cell base station 34, base station 12 would schedule and transmit that data over the air to the relay-WCD 28, the relay-WCD 28 would then pass the data to the small cell base station 34, and the small cell base station 34 would then schedule and transmit the data over the air to the served device. Likewise, when a device served by the small cell base station 34 transmits data to the small cell base station 34 for transmission on the packet-switched network 24, the small cell base station 34 would then pass the data to the relay-WCD 28, and the relay-WCD 28 would then work with base station 12 to facilitate transmission of the data over the air to base station 12. A similar but simpler arrangement may apply as well with a hotspot/D2D WCD.

In practice, each such WCD may store profile, configuration, or status data that specifies the extent to which the WCD provides connectivity for at least one other device. For instance, the WCD could store data that indicates whether the WCD is the type of device that provides such connectivity (e.g., an indication of whether the WCD is configured, connected, or otherwise arranged to operate as a relay-WCD for a small cell base station, or configured to operate as a hotspot/D2D WCD) or is rather just an endpoint (e.g., end-user) device. Further, if the WCD is the type of device that provides such connectivity, the WCD could store data that indicates the how many devices the WCD is currently providing with such connectivity.

This data could be established and stored in each WCD in various ways and at various times. For instance, at the time of manufacture, distribution, or deployment, a WCD could be provisioned with data that specifies whether the WCD is the type of device that will provide connectivity for one or more other devices, such as whether the WCD will function as a relay-WCD or hotspot/D2D type device or will rather function as an endpoint device. Further, while in use, the WCD could be provisioned or re-provisioned with such data if the profile, configuration, or status of the WCD changes, such as if an endpoint WCD gets connected and set to function as a relay-WCD or gets provisioned with hotspot/D2D functionality.

By way of example, an endpoint WCD could be provisioned with data indicating that the WCD does not provide connectivity for one or more other devices (or, just as well, could lack data that indicates the WCD provides connectivity for one or more other devices). Further, a relay-WCD or hotspot/D2D WCD could be provisioned with data indicating that the WCD provides connectivity for one or more other devices, such as a general indication that the WCD is configured to provide such connectivity, or a specific indication that the WCD is currently providing such connectivity. Still further, a WCD that provides connectivity for one or more other devices could be provisioned with data that indicates the number of such devices for which the WCD is currently providing connectivity. For instance, a relay-WCD could receive from its associated small cell base station an indication of the number of devices that are currently connected with or otherwise served by the small cell base station, including updates as the number changes, and could store that number as the number of devices for which the relay-WCD is currently providing connectivity. And a hotspot/D2D WCD could likewise determine and store an indication of how many other devices the hotspot/D2D WCD is currently providing with connectivity. Variations and other examples are possible as well.

In addition, base station 12 may also store such profile, configuration, or status data respectively for each WCD that is attached with the base station 12. The base station could receive some of this data from the WCD or from the MME, perhaps when the WCD initially attaches with the base station, and the base station could store the data in a context record for the WCD. Further, as the WCD's configuration or status changes, such as if the WCD transitions between being an endpoint WCD to being a WCD that provides connectivity for one or more other devices, or when the number of devices for which the WCD provides connectivity changes, the base station could receive updated data indicating the change. For instance, when the WCD transmits to base station 12 a channel state report, the WCD could conveniently include in or with that report an indication of the extent to which the WCD provides connectivity between the base station and one or more other devices, and the base station could update its records for the WCD accordingly.

As noted above, the present disclosure provides for managing a WCD's channel state reporting rate based on consideration of the extent to which the WCD provides connectivity for one or more other devices. The channel state reports at issue here could specify various channel state metrics, such as any of the channel state metrics conventionally reported in an LTE or other system, and/or any other channel state metrics now known or later developed.

By way of example, in LTE, a WCD may be configured to report channel state information (CSI) such as channel quality information (CQI) (e.g., a value corresponding with measured signal to noise ratio across the serving carrier or in particular sub-bands of the carrier), precoding matrix indicators (PMI) (indicating preferred weights to be applied during precoding, to help optimize downlink signal to noise ratio), and rank indicator (RI) (related to which transmission mode should be used for downlink transmission). In normal practice, base station 12 may broadcast an overhead system information message that specifies the periodicity for WCD transmission of channel state reports providing such information, such as a CQI-PMI-ConfigIndex that specifies periodicity for sending CQI and PMI reports, and an RI-ConfigIndex that specifies periodicity for sending RI reports. And served WCDs operate accordingly, determining and reporting their channel state at the indicated rate.

The present method could apply with respect to reporting of any or all of these LTE channel state metrics. In practice, for instance, base station 12 could still broadcast the above system parameters as default channel state reporting rates to be applied by served WCDs. But a served WCD or the base station (or other entity) could then further apply the present method for the served WCD, to determine an adjustment to make from those default rates, or a replacement rate to be applied. For instance, the WCD or base station could determine and apply an increase from the default rate in response to a determination that the WCD provides connectivity for one or more other devices, perhaps with the increase being greater as the WCD provides connectivity for a greater number of other devices. Or the WCD or base station could similarly select a replacement rate to be applied based on the extent to which the WCD provides connectivity for at least one other device.

To do this in practice, the WCD or base station could be programmed with logic executable to determine the extent to which the WCD provides connectivity for at least one other device, and, based on that determined extent, to establish and cause the WCD to apply an appropriate channel state reporting rate. For instance, the WCD or base station could be programmed with data that correlates various channel state reporting rates (and/or adjustments from default channel state reporting rates) with various extents to which a WCD provides connectivity between at least one other device and the base station. And this data could further be defined respectively for each of various types of channel state reports (e.g., separately for CQI-PMI reports, and separately for RI reports).

Thus, the WCD or base station could refer to their latest data on the extent to which the WCD provides connectivity for at least one or more other devices and could then refer to this mapping data so as to establish a channel state reporting rate for the WCD to apply. If the WCD does this, then the WCD can then simply proceed to apply the established channel state reporting rate. Whereas, if the base station does this, then the base station can then transmit to the WCD (e.g., in an RRC connection reconfiguration message or other control message) a directive interpretable by the WCD to cause the WCD to apply the established channel state reporting rate. And the WCD may then operate accordingly.

Figure 2:
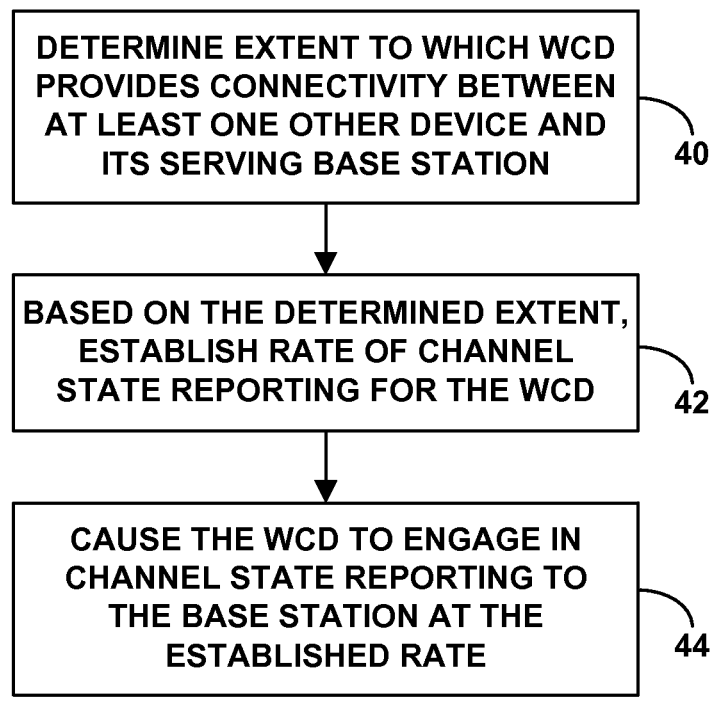
FIG. 2 is a flow chart depicting example operations in accordance with the disclosure.

FIG. 2 is next a flow chart depicting features of a representative method for controlling the rate of channel state reporting by a WCD to a base station when the WCD is being served by the base station. As shown in FIG. 2, at block 40, the method includes determining an extent to which the WCD provides connectivity between at least one other device and the base station. At block 42, the method then includes, based on the determined extent, establishing the rate of channel state reporting. And at block 44, the method includes causing the WCD to engage in channel state reporting to the base station at the established rate.

In line with the discussion above, this method could be carried out by the WCD, by the base station, or by one or more other entities. Further, the rate of channel state reporting could define how often the WCD transmits to the base station a report indicating state of a wireless channel communicatively linking the base station with the WCD, such as a report indicating one or more of (i) downlink signal quality information, (ii) precoding matrix information, and (iii) rank indicator information.

Further in line with the discussion above, the act of determining the extent to which the WCD provides connectivity between at least one other device and the base station could involve determining whether the WCD provides connectivity between at least one other device and the base station (e.g., whether the WCD is a relay-WCD or a relay-WCD type device (perhaps a hotspot/D2D device)). And the act of establishing the rate of channel state reporting could involve establishing as the rate (i) a first rate if the determination is that the WCD provides connectivity between at least one other device and the base station and (ii) a second rate if the determination is that the WCD does not provide connectivity between at least one other device and the base station, with the first rate being higher than the second rate. Alternatively or additionally, for a WCD that provides connectivity between the base station and a quantity of other devices, the act of establishing the rate of channel state reporting could include establishing the rate based on the quantity.

Figure 3:
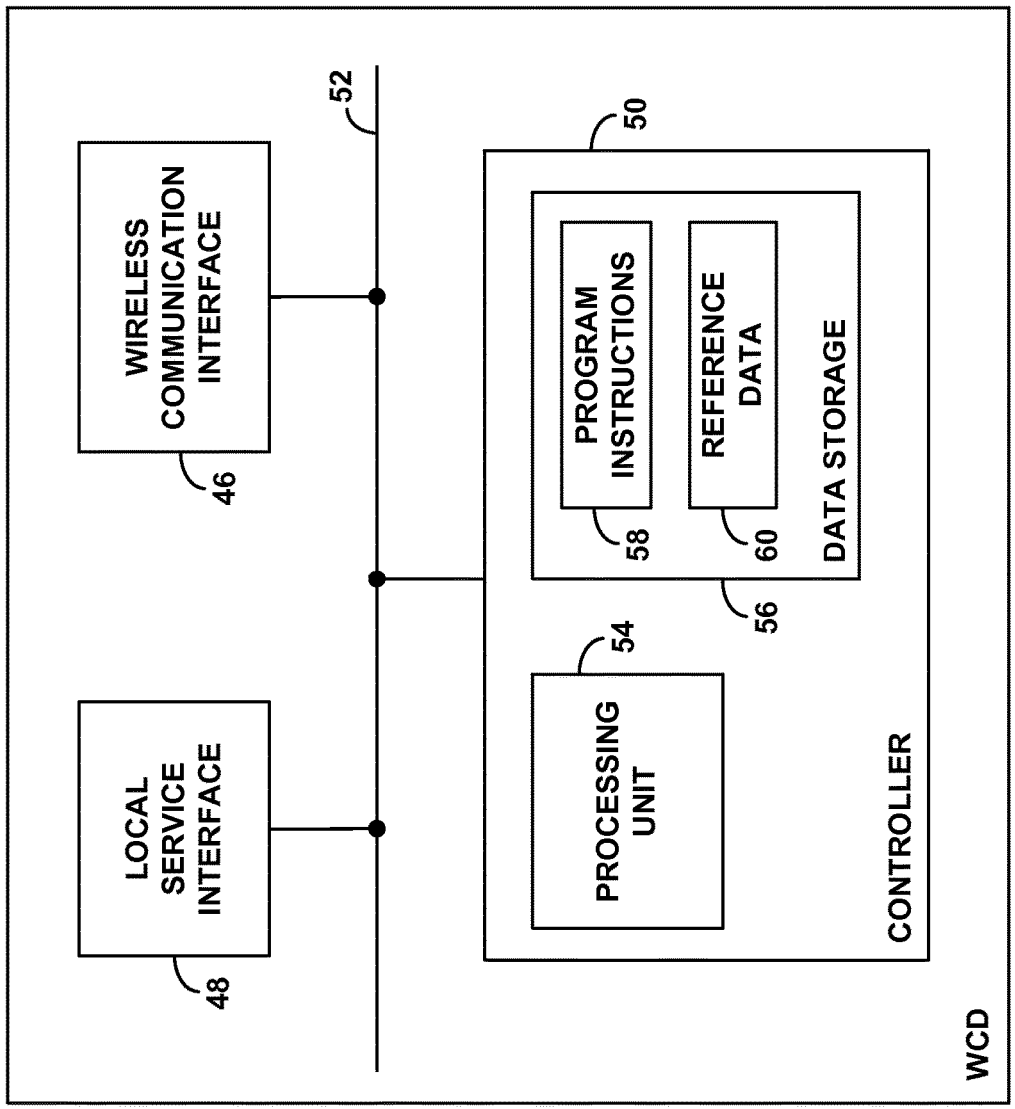
FIG. 3 is simplified block diagram of an example WCD operable in accordance with the disclosure.

FIG. 3 is next a simplified block diagram of a WCD, showing some of the components that such a device could include in accordance with an example implementation. In particular, the example WCD is configured to dynamically control how often the WCD transmits channel state reports to a base station when the WCD is being served by the base station, where the channel state reports are for a wireless channel between the base station and the WCD, and where the WCD is configured to provide connectivity between at least one other device and the base station. Such a WCD could be a relay-WCD or a hotspot/D2D node for instance.

As shown in FIG. 3, the example WCD includes a wireless communication interface 46, local service interface 48, and a controller 50, all of which could be coupled together or otherwise interconnected by a system bus, network, or other connection mechanism 52. Further, these or other components of the WCD could be integrated together in various ways. For instance, the controller could be provided as logic on a chipset that also serves as at least part of the wireless communication interface or local service interface. And the wireless communication interface and local service interface could be combined together. Further, the WCD could include other components and take other forms. For instance, if the WCD is user operated, the WCD could include a user interface. Other examples are possible as well.

In the example WCD, the wireless communication interface 46 could be configured to engage in wireless communication with the base station that serves the WCD, via a wireless channel between the WCD and the base station. As such, the wireless communication interface could include a radio compliant with the protocol that the WCD will use for communication with the base station, such as LTE for instance, and could further include an antenna structure for transmitting and receiving via the wireless channel.

The local service interface 48 could then be configured to engage in communication directly or indirectly with one or more other devices. For example, the local interface could be configured to communicate with a small cell base station that in turn serves one or more other devices, and/or the local interface could be configured to communicate more directly with one or more other devices. Further, the local service interface could provide for wired and/or wireless communication with the one or more other devices. For instance, the local service interface could include a wireless communication interface that operates to communicate with one or more other entities over the same air interface protocol used by wireless communication interface 46 or over a different air interface protocol. (By way of example, the wireless communication interface 46 could communicate with the serving base station according to LTE, and the local service interface 48 could communicate with other devices using LTE or using WiFi.) Alternatively, the local service interface could be configured for connection with a wired link such as an Ethernet connection or other cable connection with one or more other entities.

With these interfaces, the WCD could operate to be served by, and thus communicate data to and from, its serving base station on the one hand and to communicate data to and from one or more other devices on the other hand. Thus, the WCD could function as an intermediary providing connectivity between the one or more other devices and the base station.

The controller 50, in turn, could be configured to control operation of the WCD including implementing various WCD operations described herein, such as (i) establishing, based on how many other devices the WCD is providing with connectivity to its serving base station, a channel state reporting rate defining how often the WCD should transmit channel state reports to the base station and (ii) causing the WCD to transmit channel state reports to the base station at the established channel state reporting rate.

As shown by way of example, the controller could include a processing unit 54 and data storage 56. Processing unit 54 could comprise one or more general purpose processors (e.g., microprocessors) and/or one or more special-purpose processors (e.g., application specific integrated circuits or digital signal processors). And data storage 56 could comprise one or more non-transitory volatile and/or non-volatile storage components, such as magnetic, optical, or flash memory, and could hold or be encoded with program instructions 58 and reference data 60. Program instructions 58 could be executable by processing unit 54 to carry out various WCD operations described herein. And reference data 60 could include various data to facilitate carrying out the operations, such as data indicating the extent to which the WCD provides connectivity between its serving base station and one or more other devices, and mapping data that correlates various channel state reporting rates with particular extents to which the WCD provides connectivity between its serving base station and one or more other devices.

Figure 4:
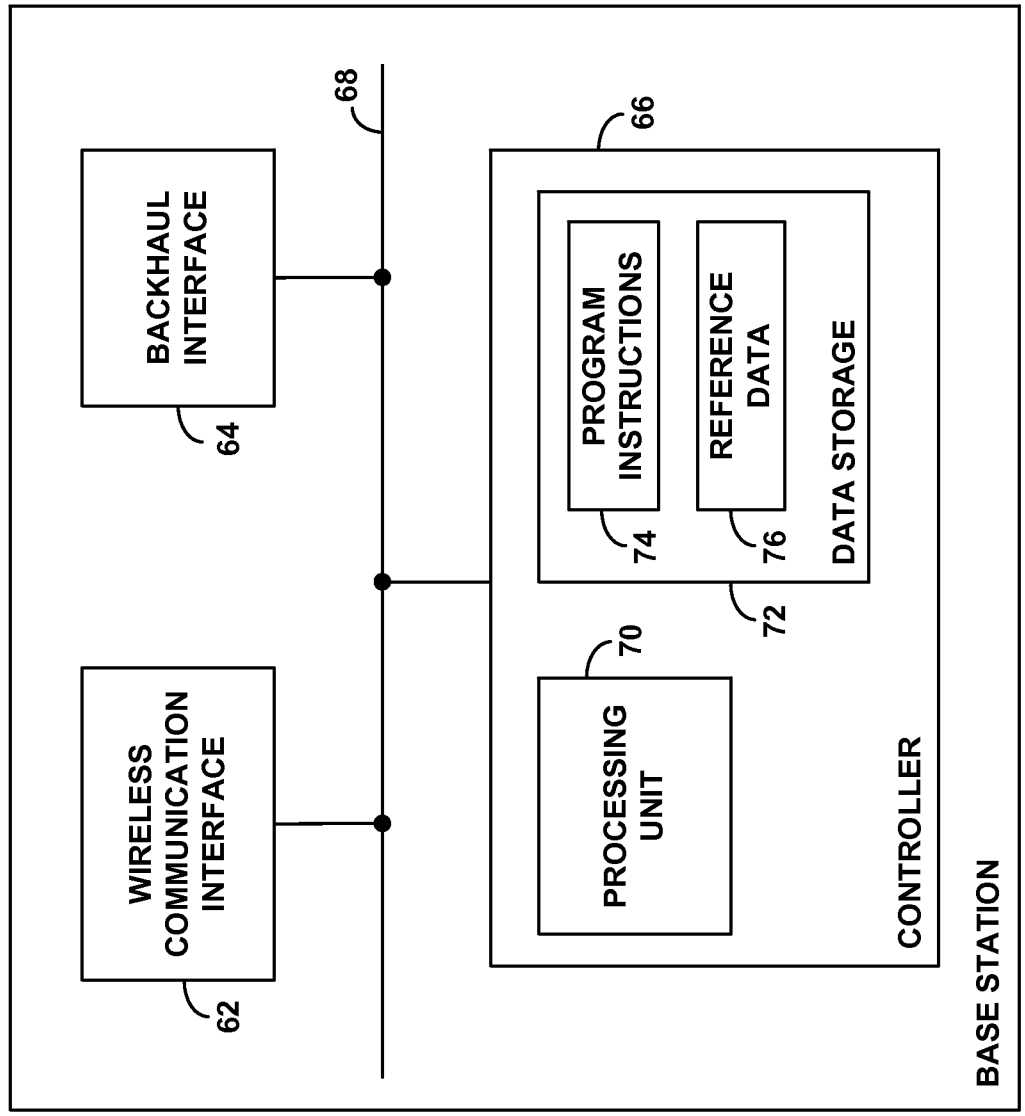
FIG. 4 is simplified block diagram of an example base station operable in accordance with the disclosure.

FIG. 4 is next a simplified block diagram of a base station (such as base station 12), showing some of the components that such an entity could include in accordance with an example implementation. In particular, the example base station is configured to control how often a WCD transmits channel state reports to the base station when the WCD is being served by the base station, where the channel state reports are for a wireless channel between the base station and the WCD. The example base station could be a macro base station of the type that typically includes a tower top antenna structure and provides a broad range of coverage, or the base station could be a small cell base station (e.g., femtocell, mini-macro, or the like) that typically has a smaller form factor and provides a narrower range of coverage. Under LTE, the base station could be an eNodeB. Under other protocols, the base station could take other forms.

As shown in FIG. 4, the example base station includes a wireless communication interface 62, a backhaul interface 64, and a controller 66, all of which could be coupled together or otherwise interconnected by a system bus, network, or other connection mechanism 68. Further, these or other components of the base station could be integrated together in various ways.

In the example base station, the wireless communication interface 46 could be configured to engage in wireless communication with a served WCD via a wireless channel between the base station and the WCD. As such, the wireless communication interface could include a radio compliant with the protocol that the base station will use for communication with the WCD station, such as LTE for instance, and could further include an antenna structure for transmitting and receiving via the wireless channel. The backhaul interface 64 may then be a wired or wireless interface for communicating with various core network entities, such as with an SGW and MME as discussed above for instance.

The controller 66, in turn, could be configured to control operation of the base station including implementing various base station operations described herein, such as (i) establishing, based on an extent to which the WCD provides connectivity between one or more other devices and the base station, a channel state reporting rate defining how often the WCD should transmit channel state reports to the base station and (ii) causing the WCD to transmit channel state reports to the base station at the established channel state reporting rate.

As shown by way of example, the controller 66 could include a processing unit 70 and data storage 72. Processing unit 70 could comprise one or more general purpose processors (e.g., microprocessors) and/or one or more special-purpose processors (e.g., application specific integrated circuits or digital signal processors). And data storage 72 could comprise one or more non-transitory volatile and/or non-volatile storage components, such as magnetic, optical, or flash memory, and could hold or be encoded with program instructions 74 and reference data 76. Program instructions 74 could be executable by processing unit 70 to carry out various base station operations described herein. And reference data 76 could include various data to facilitate carrying out the operations, such as data indicating the extent to which the WCD provides connectivity between its serving base station and one or more other devices, and mapping data that correlates various channel state reporting rates with particular extents to which the WCD provides connectivity between its serving base station and one or more other devices.

In line with the discussion above, the base station could receive from the WCD a report of the extent to which the WCD provides connectivity for one or more other devices, such as whether or not the device is configured to provide such connectivity and perhaps how many devices the WCD is providing with such connectivity. Alternatively, the base station could receive such information from a network based profile/configuration record for the WCD. And still alternatively, the base station could determine the extent in some other way. For instance, the base station could engage in deep packet inspection or the like to determine the number of devices for which the WCD provides with connectivity by determining the number of different source addresses within data communication from the WCD or by determining the number of destination addresses within data communication to the WCD. Further, the base station could be configured to provide under multiple public land mobile network (PLMN) identifiers, one of which is specifically for WCDs that provide such connectivity, and so the base station could determine that the WCD provides such connectivity by determining that the WCD attaches or otherwise connects with the base station under that particular PLMN identifier. Other implementations are possible as well.

In turn, upon determining the extent to which the WCD provides connectivity for one or more other devices, the base station could then establish based on that extent a channel state reporting rate to be applied by the WCD, and the base station could transmit to the WCD a control signal defining a directive for the WCD to engage in channel state reporting to the base station at the established rate. For instance, in LTE, the base station could send such a directive to the WCD as an RRC connection reconfiguration message or in another downlink control message.

Exemplary embodiments have been described above. Those skilled in the art will understand, however, that changes and modifications may be made to these embodiments without departing from the true scope and spirit of the invention.

What is claimed is:

1. A method of controlling rate of channel state reporting by a wireless communication device (WCD) to a base station when the WCD is being served by the base station, wherein the WCD provides various extents of connectivity between at least one other device and the base station, wherein each extent of connectivity is a respective quantity of how many other devices the WCD provides with connectivity to the base station, the method comprising:
   determining a current extent to which the WCD provides connectivity between at least one other device and the base station, wherein the current extent to which the WCD provides connectivity between at least one other device and the base station is a quantity of other devices that the WCD is currently providing with connectivity to the base station;
   establishing the rate of channel state reporting based on the determined current extent, wherein establishing the rate of channel state reporting based on the determined current extent comprises referring to mapping data that correlates (i) various rates of channel state reporting with (ii) the various extents; and
   causing the WCD to engage in channel state reporting to the base station at the established rate.

2. The method of claim 1, carried out by the WCD.

3. The method of claim 1, carried out by the base station, wherein causing the WCD to engage in channel state reporting to the base station at the established rate comprises transmitting from the base station to the WCD a control signal directing the WCD to engage in channel state reporting to the base station at the established rate.

4. The method of claim 1, wherein the rate of channel state reporting by the WCD to the base station defines how often the WCD transmits to the base station a report indicating state of a wireless channel communicatively linking the base station with the WCD, wherein the report indicates one or more of (i) downlink signal quality information, (ii) precoding matrix information, and (iii) rank indicator information.

5. The method of claim 1, wherein establishing the rate of channel state reporting based on the determined current extent comprises:
   establishing as the rate (i) a first rate if the determined current extent is a first quantity of other devices that the WCD is currently providing with connectivity to the base station and (ii) a second rate if the determined current extent is a second quantity of other devices that the WCD is currently providing with connectivity to the base station, wherein the first quantity is different than the second quantity, and wherein the first rate is different than the second rate.

6. The method of claim 5, wherein the first quantity is higher than the second quantity, and wherein the first rate is higher than the second rate.

7. The method of claim 1, further comprising determining whether the WCD is a relay-WCD type device.

8. A wireless communication device (WCD) configured to dynamically control how often the WCD transmits channel state reports to a base station when the WCD is being served by the base station, wherein the channel state reports are for a wireless channel between the base station and the WCD, wherein the WCD is configured to provide various extents of connectivity between at least one other device and the base station, wherein each extent of connectivity is a respective quantity of how many other devices the WCD provides with connectivity to the base station, the WCD comprising:
   a wireless communication interface configured to engage in wireless communication with the base station via the wireless channel between the WCD and the base station; and
   a controller, wherein the controller is configured (i) to establish, based on how many other devices the WCD is currently providing with connectivity to the base station, a channel state reporting rate defining how often the WCD should transmit channel state reports to the base station and (ii) to cause the WCD to transmit channel state reports to the base station at the established channel state reporting rate, wherein establishing the channel state reporting rate based on how many devices the WCD is currently providing with connectivity to the base station comprises referring to mapping data that correlates various channel state reporting rates with the various extents of connectivity between the at least one other device and the base station.

9. The WCD of claim 8, wherein the channel state reports indicate one or more of (i) downlink signal quality information, (ii) precoding matrix information, and (iii) rank indicator information.

10. The WCD of claim 8, wherein the controller is further configured to determine how many other devices the WCD is currently providing with connectivity to the base station, so as to facilitate then establishing the channel state reporting rate.

11. The WCD of claim 10, wherein the base station is a first base station, wherein the WCD is a relay-WCD configured to provide a second base station with wireless backhaul connectivity to the first base station, wherein the second base station is configured to serve the at least one other device, and wherein determining how many other devices the WCD is currently providing with connectivity to the base station comprises receiving from the second base station a report of quantity of devices that the second base station is serving.

12. The WCD of claim 8, wherein the WCD is configured to serve the at least one other device, and wherein determining how many other devices the WCD is currently providing with connectivity to the base station comprises determining how many other devices the WCD is currently serving.

13. The WCD of claim 12, wherein the WCD is configured to be served by the base station according to a first air interface protocol, and wherein the WCD is configured to serve the at least one other device according to the first air interface protocol as well.

14. The WCD of claim 12, wherein the WCD is configured to be served by the base station according to a first air interface protocol, and wherein the WCD is configured to serve the at least one other device according to a second air interface protocol different than the first air interface protocol.

15. A base station configured to control how often a wireless communication device (WCD) transmits channel state reports to the base station when the WCD is being served by the base station and is providing a quantity of other devices with connectivity to the base station, the quantity being at least one, wherein the channel state reports are for a wireless channel between the base station and the WCD, the base station comprising:

a wireless communication interface configured to communicate with the WCD via the wireless channel between the base station and the WCD; and a controller, wherein the controller is configured (i) to establish, based on the quantity of other devices that the WCD is providing with connectivity to the base station, a channel state reporting rate defining how often the WCD should transmit channel state reports to the base station and (ii) to cause the WCD to transmit channel state reports to the base station at the established channel state reporting rate, wherein establishing the channel state reporting rate based on the quantity of other devices that the WCD is providing with connectivity to the base station comprises referring to mapping data that correlates various channel state reporting rates with various extents to which the WCD provides connectivity with the base station, wherein each extent is a respective quantity of other devices that the WCD provides with connectivity to the base station.

16. The base station of claim 15, wherein causing the WCD to engage in channel state reporting to the base station at the established rate comprises transmitting to the WCD a control signal directing the WCD to engage in channel state reporting to the base station at the established rate.

17. The base station of claim 15, wherein the channel state reporting rate defines how often the WCD transmits to the base station a report indicating state of the wireless channel, wherein the report indicates one or more of (i) downlink signal quality information, (ii) precoding matrix information, and (iii) rank indicator information.

18. The base station of claim 15, wherein establishing the channel state reporting rate comprises:

establishing as the rate (i) a first rate if the quantity of other devices that the WCD is providing with connectivity to the base station is a first quantity and (ii) a second rate if the quantity of other devices that the WCD is providing with connectivity to the base station is a second quantity, wherein the first quantity is different than the second quantity, and wherein the first rate is different than the second rate.

19. The base station of claim 18, wherein the first quantity is higher than the second quantity, and wherein the first rate is higher than the second rate.

20. The base station of claim 19, wherein the controller is further configured to receive a report indicating the quantity of other devices that the WCD is providing with connectivity to the base station and to establish the rate based on the quantity indicated by the received report.

* * * * *